INVENTORS
RICHARD W. SONNENFELDT
& GUSTAVE L. GRUNDMANN
BY
ATTORNEY 2,921,121
Patented Jan. 12, 1960

2,921,121

NOTCH FILTER IN BRIGHTNESS CHANNEL OF COLOR TELEVISION TRANSMITTER

Gustave Louis Grundmann, Westmont, and Richard Wolfgang Sonnenfeldt, Haddonfield, N.J., assignors to Radio Corporation of America, a corporation of Delaware Application April 1, 1955, Serial No. 498,520

3 Claims. (Cl. 178—5.4)

The invention relates to compatible color television program transmission, and it particularly pertains to means for assuring high quality image reproduction on both monochrome and polychrome television receivers in response to polychrome image signals.

Present day color television program transmission in the United States is compatible television program transmission. That is, the conventional color television receivers, in addition to reproducing a full-color image will reproduce a monochrome image when tuned to a station transmitting black-and-white or monochrome image signals, and the conventional black-and-white or television receiver without any changes or additions will reproduce a monochrome image whether tuned to a station transmitting monochrome or polychrome television image signals. Efforts are continually being made by both monochrome and polychrome broadcasters to improve the quality of the image signals broadcast. From the compatible standpoint the black-and-white television receiver will now reproduce a high quality monochrome image in response to polychrome image signals and the color television receiver will now reproduce a monochrome image of the highest quality in response to monochrome image signals. There are, however, a large number of monochrome television receivers already in the hands of the public and it is expected that manufacturing sales of monochrome television receivers will continue for some time to come despite the desire for polychrome television receivers on the part of the public. Moreover, the trend is toward more and more full-color or polychrome television program broadcasts so that there will be more and more color television receivers in use as time goes on. In order to obtain as large a television audience as possible to receive advertising messages and the like for which they are reimbursed for their efforts, television broadcasters are interested in broadcasting color image signals for reception by both the black-and-white or monochrome television receivers and color or polychrome television receivers with equal efficacy.

The monochrome camera is operated at a non-linear portion of the operating curve, generally termed "over the knee" by the artisan, which operation is not permissible in generating color image signals because the color camera in order to produce the proper color range must be operated over the linear portion of the characteristic curve. To obtain the same relative sharpness in the color television image reproduced by a monochrome receiver operating in response to polychrome image signals, it is necessary to peak or "aperture-correct" the color signal by additional circuitry. However, the image on the polychrome receiver is thereby adversely effected because the high frequency noise is increased, which high frequency noise is beat down to low frequency noise by the color difference signal demodulating circuitry without appreciably reducing the amplitude of the noise, and also because the brightness signal component near the color subcarrier frequency is increased, giving rise to undesirable "cross-pix" effects, which effects are analogous to the "cross-talk" effects occurring in voice communication systems.

An object of the invention is to operate a polychrome television signal broadcasting transmitter to provide like quality or image reproduction by conventional monochrome and polychrome television receivers.

Another object of the invention is to provide simple means for peaking the luminance or brightness signal of a color television image broadcasting transmitter to effect high quality reproduction of the image by monochrome and polychrome television receivers alike.

A further object of the invention is to provide simple means for modifying polychrome television image signals produced by a color broadcast transmitter which have been peaked to provide high quality image reproduction by conventional monochrome receivers to also provide high quality image reproduction by conventional polychrome television receivers.

Still another object of the invention is to provide polychrome television image broadcasting apparatus radiating color or polychrome television image signals effecting reproduction of the image with equal efficacy by monochrome and polychrome television receivers alike.

According to the invention notch filtering at or near the color subcarrier frequency, and preferably peaking at other frequencies as well, is performed on the signal in the luminance or brightness channel of a polychrome television image signal transmission system before combining with the signals in the chrominance or color difference channel and the color phase signal reference bursts and other of the synchronizing and blanking signals.

In practice, relatively simple notch filter circuitry tuned to a frequency to provide appreciable attenuation at a frequency equal to or near to the color subcarrier frequency is interposed in the luminance channel of otherwise conventional transmitting apparatus. This filter circuitry eliminates beat-down noise and reduces cross-pix effects to a tolerable level, at which level any desirable amount of peaking may be introduced at other frequencies to crispen the image. According to the invention peaking circuitry is preferably incorporated in the notch filtering circuitry but other forms of peaking circuitry and/or operation of conventional components may serve as well. The transmitting circuit arrangement may otherwise comprise entirely conventional components and the overall result is greatly improved image reproduction and sharpness both on monochrome and polychrome receivers with reduced background noise and cross-pix effects.

In order that the practical aspects may be more fully appreciated and readily obtained in practice, a specific embodiment of the invention, given by way of example only, is described below with reference to the accompanying drawing forming a part of the specification and in which.

Figure 1:
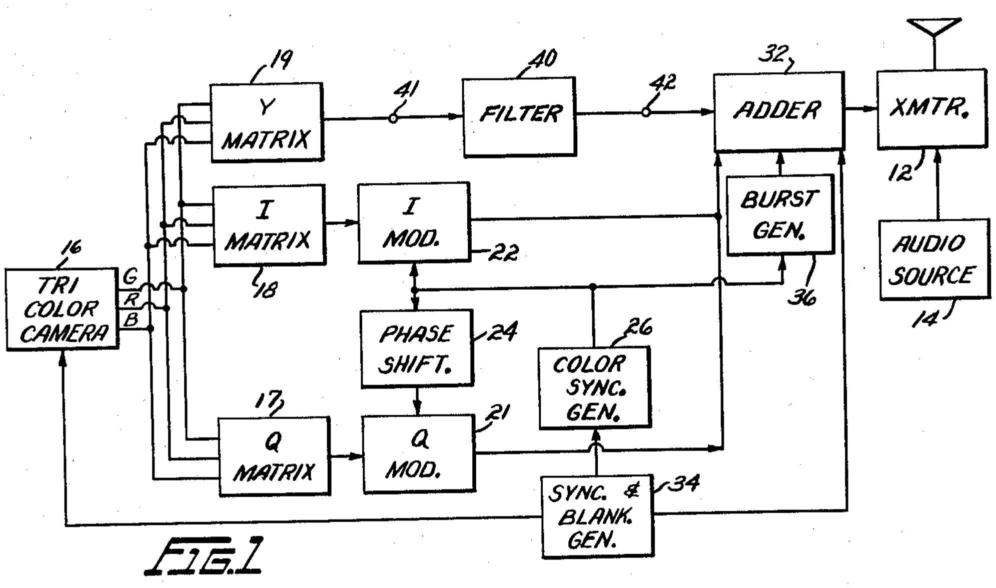
Fig. 1 is a functional diagram of an example of conventional color television broadcasting apparatus as modified according to the invention.

Referring to Fig. 1 there is shown a functional diagram of color television program signal broadcasting apparatus for radiating polychrome television image signals according to the invention, comprising a transmitter 12 having an aural signal portion which develops an aural signal in response to audio frequency modulation from source 14 which is the source of the sound to be reproduced at the receiver. The transmitter 12 also has a visual portion which produces a visual signal for radiation in response to signals from a source of video frequency waves providing the information for reproducing the television image which in conjunction with the sound reproduction constitutes the complete television program. The prime source of video signal emanates from a tri-color camera 16. The tri-color camera 16 is essentially three monochrome cameras with different color filters interposed in the optical systems to produce red, green and blue or other color component signals. The three color component signals are applied to each of three matrices 17, 18 and 19. In these matrices, portions of the red, green and blue component signals are mixed in proportions set forth in the Technical Standards of the Federal Communication Commission adopted December 17, 1953, and released as FCC Public Notice No. 53–1663, Mimeo 98948, to produce two signals, known as I–Q signals, comprising color difference or chrominance channel signals and another signal, known as an M or Y signal, comprising a luminance channel or brightness signal. This brightness signal, which is effective to reproduce black-and-white images on monochrome television receivers, is not passed through any modulator as a modulation process would garble the image information insofar as conventional monochrome television receivers are concerned. The color difference components obtained from the I and Q matrices 17, 18 are applied to respective modulating circuits 21, 22 to which opposite phases, as determined by a phase shifting circuit 24, of a color reference signal wave obtained from a color reference synchronizing wave generator 26 are applied. This color reference wave is presently established by FCC standards above mentioned at 3.58 mc. and is within the frequency spectrum of the luminance signal in order to save bandwidth. The modulating circuits 21 and 22 are doubly balanced or otherwise arranged so that only the sidebands of the modulated subcarriers appear at the output terminals. In the conventional color television transmitting arrangement the output of the brightness channel matrix 19 is applied directly to compatible color signal adding circuitry 32 along with the output of the I and Q modulating circuits 21, 22. Also applied to the compatible color signal adding circuitry are synchronizing and blanking pulses obtained from a synchronizing and blanking pulse generating circuit 34 the output of which is also applied to the tri-color camera 16 and the color phase synchronizing wave generating circuit 26. In order that the homodyning operation at the receiver may be properly synchronized with the modulated subcarrier at the transmitter, a portion of the color synchronizing wave obtained by means of a keying circuit or burst generating circuit 36 from the color synchronizing wave generating circuit 25 is placed on the "back porch" of the horizontal blanking pulse in a manner amply described in a publication entitled "RCA Bulletin on Color Television and UHF" October 1949 to July 1950. All of the components thus far described are well known in the art and much additional material describing these components can be obtained from the second edition of "Television Engineering" by Donald G. Fink, published by McGraw-Hill in 1952 and will not be further described. It should also be understood that according to the invention it is not necessary to use the exact arrangement shown in Fig. 1 but that any compatible color transmitting circuit arrangement now known in the art, or even one to be developed, which has at least a luminance channel and a chrominance channel separate and apart from each other may be modified according to the invention to achieve the desired results.

According to the invention a filter network 40 having input terminals 41 and output terminals 42 are interposed between the output of the luminance or brightness component matrix 19 and the luminance channel input terminals of the compatible color signal adding circuitry 32. According to the invention the filter network 40 is arranged to present a notch at or near the color phase reference frequency, which is 3.58 mc. according to present standards and subject to change although that is not likely. From a study of Fig. 4(c) of the above-identified FCC Public Notice No. 53–1663 it will be seen that color difference signals other than the so-called I–Q signals at 90° phase difference may be utilized to transmit color television image signal and it is fully contemplated that filtering according to the invention may be used with such other systems.

Figure 2:
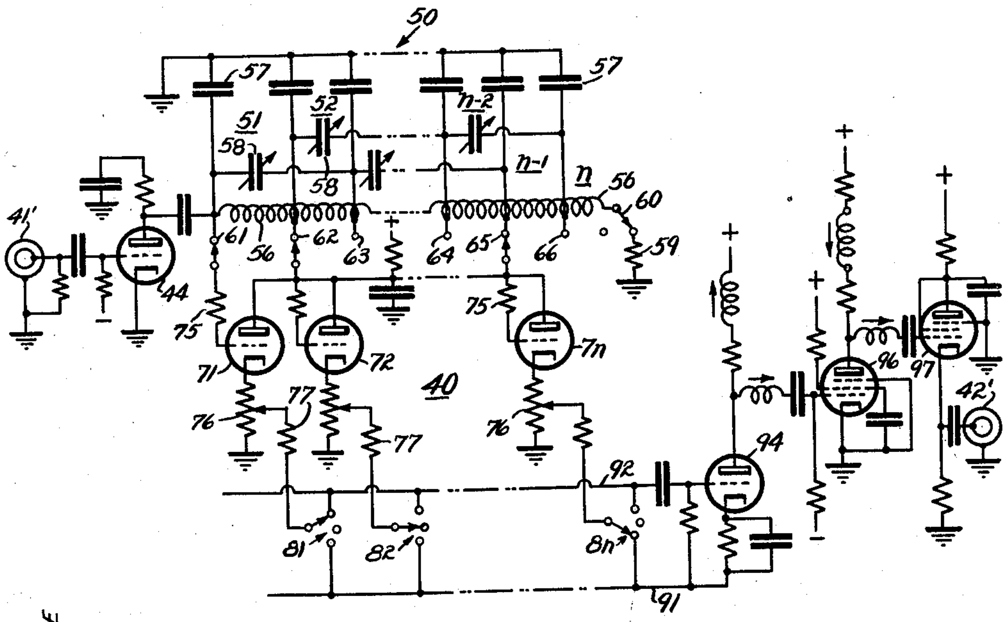
Fig. 2 is a schematic diagram of an example of notch filtering and wave peaking circuitry for use in modifying conventional color television broadcasting apparatus, an example of which is functionally illustrated in Fig. 1.

The filter network 40 is not limited to any specific form according to the invention, but an example of a filter network which has been used with completely satisfactory results is shown in Fig. 2. The output of the brightness signal matrix 19 at the input terminals 41′ is applied to an input wave amplifying tube 44. To the anode of the input amplifying tube 44 there is connected a delay line 50 comprising a plurality of sections 51, 52 . . . *n*–2, *n*–1, *n* constituted by like inductance elements 56 with associated like capacitive reactance shunting elements 57 and bridging elements 58. Each section is connected to a pin jack or switch point of which only 61—66 are shown. These jacks or switch points serve to present voltages along the delay line 50. A plurality of vacuum tubes 71, 72 . . . 7*n* connected in known cathode follower circuitry are arranged to be connected to any one of the jacks or switch points 61—66. Each of the cathode followers is provided with an attenuation control 76 in the cathode circuit, whereby the amplitude of the voltage obtained from the delay line 50 may be varied and the output is applied through individual switches 31, 82, . . . 8*n* to one of two buses 91, 12. Each switch has a center position so that if less than the maximum number of cathode followers are to be used the idle circuits will not load the circuit to which the buses are connected. One bus 91 is used to apply the outputs of selected cathode followers to the cathode electrode of a phase inverting and mixing tube 94, while the other bus 92 applies the outputs of other selected cathode followers to the grid electrode of this tube. At the anode electrode of the mixing tube 94 the cathode voltage will appear amplified in the same phase, while the grid voltage will appear with the usual 180° phase inversion. Thus the switches 81, 82, . . . 8*n* are means for reversing the algebraic sign of the mathematical terms determining the overall constants and characteristics of the filter network 40. Wide-band amplification to render the amplitude of the output equal to the input is provided by two pentode tubes 96, 97 connected in cascade and presenting the notched and peaked luminance signal at the output terminals 42′ which are connected in the cathode circuit of the final amplifier tube 97 in the filter arrangement shown to provide low impedance such as would be encountered with coaxial transmission lines.

The voltage at any point on the delay line 50 with the switch 60 open is made up of two waves, one traveling down the line and the other returning with the time lapse between the two waves proportional to the distance from the reflecting end of the line. Since the voltage on any point of the line is in phase with the voltage at all other points of the line, they can be combined algebraically in accordance with the terms of a fourier series. By means of potentiometers 76 it is possible to attenuate any of the voltages without phase shift and by means of the switches 81, 82 . . . 8*n* it is possible at will the algebraic sign to be associated with each voltage. For each problem at hand a finite fourier series with as many terms as necessary are set up. With the filter network shown in Fig. 2 it is possible to synthesize to a very good approximation almost any selectivity curve than can be expressed by a fourier cosine series.

Figure 3:
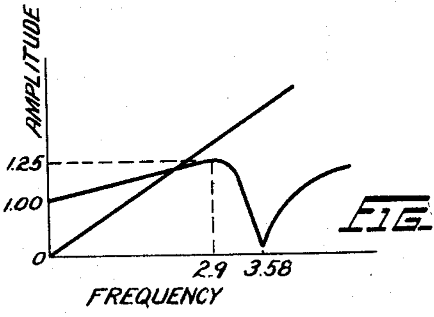
Fig. 3 is a graphical representation of the attenuation of notch filtering circuitry that may be obtained with the notch filtering and peaking circuitry shown in Fig. 2.

With the delay line 50 terminated at the sending end by a resistor 59 of value equal to the characteristic impedance of the delay line, the circuit arrangement provides selectivity at constant time delay. Voltages at the various taps are combined by selection to produce the desired transient response. Referring to Fig. 3 there is shown the selectivity and phase response desired for the application of the filter network 40 to the transmitting circuit according to the invention. In this application it is desired that the attenuation due to the filter be quite low, that is the amplitude of the applied waveform by unity or higher, up to the frequency of maximum peaking at approximately 2.9 mc. at which it is desired to begin notching. The maximum attenuation desired is obtained at 3.58 mc. or thereabout. The amplitude of the wave passed at the subcarrier frequency point 3.58 mc. need not go completely to zero, nor does the response need to rise again beyond 3.58 mc. The curve shown in Fig. 3 will provide optimum operation, but a shallower notch will produce practically acceptable results. It is estimated that a notch as shallow as 10 db. down will be acceptable under certain conditions. Another type of filter, such as a low pass filter, may be used, and the failure of the response of this filter to rise again beyond 3.58 mc. will only discard some high frequency video information which in many cases will not be necessary for image reproduction of good quality. The phase characteristic of the filter network is plotted and is shown to be a straight line; that is to say, the phase angle is directly proportional to the frequency.

In a color television transmission circuit arrangement utilizing a filter network shown in Fig. 2 the values listed below were used for the pertinent components.

| Ref. No. | Component | Type or Value |
|---|---|---|
| 44 | Input amplifier tube | 6BQ7 parallel connected. |
| 50 | Delay line | 50 sections as shown. |
| 56 | Inductors | 21 turns, #25 enam., ½" dia. |
| 57 | Shunt capacitors | 210 mmf. 1% low temp. |
| 58 | Bridging capacitors | 28 mmf. |
| 59 | Terminating resistor | 185 ohms. |
| 71–7*n* | Cathode followers | ½ 6BQ7. |
| 75 | Grid resistors | 22 ohms. |
| 76 | Attenuators | 250 ohms. |
| 77 | Series resistors | 180 ohms. |
| 94 | Phase inverting tube | ½ 6BQ7. |
| 96 | Amplifier tube | 6CL6. |
| 97 | Amplifier tube | 6V6. |

The power supply provided 150 volts positive at the points marked with a plus (+) sign and 2 volts negative at the points marked with a minus (−) sign. Ten cathode followers were used to provide the notch filtering action at 3.58 mc. and peaking at 2.9 mc.

Contrary to what might be expected from the teachings of the prior art, the transient response of the transmitting circuitry is actually improved by this modification according to the invention. Normally one would expect that repeated ringing preceding and following the transitions would be introduced by the notch filter and that there would be considerable overshooting from both sides of each transition. Actually with the circuit arrangement according to the invention the rise time is increased in the ratio of 11:9.5 which is very close to that obtained by most monochrome receivers operating in response to monochrome image signals. The ultimate resolution is essentially unaffected with the main difference being elimination of a narrow band of frequency clutter around the subcarrier frequency.

With the circuit arrangement according to the invention the tri-color camera 16 is operated in the linear range and the signal is peaked, preferably by means of adjustment of the notch filter network of the type shown in Fig. 2 but alternately by adjustment of the existing circuits or by the addition of other peaking circuitry to provide high efficacy of image reproduction by monochrome and polychrome television receivers alike. Alternately, peaking may be inherent when operating the cameras "over the knee," in which event some additional peaking can be accomplished in the notch filter network according to the invention if desired. In this mode of operation the filter network 40 must be adjusted to compensate for distortion which is caused by operating the camera over the knee.

The invention claimed is:

1. A color television transmitting circuit arrangement for radiating television signals to enable image reproduction by polychrome and monochrome receivers with like efficacy, said circuit arrangement including polychrome camera equipment for producing a plurality of output signal representative of color information, means coupled to said polychrome camera equipment for matrixing said output signals to derive luminance and chrominance signal components, means for generating a chrominance subcarrier, means coupled to said chrominance matrixing means and to said chrominance subcarrier generating means for modulating said subcarrier by said chrominance signal components, and a means including a network tuned to substantially the chrominance subcarrier frequency interposed between said luminance matrixing means and said signal adding circuitry for filtering out energy at substantially the color subcarrier frequency, said network including means for peaking said luminance signal components.

2. A color television transmitting circuit arrangement as defined in claim 1 and wherein said polychrome camera equipment is arranged to be operated over the linear portion of the operating characteristic.

3. In a color television transmitting circuit arrangement having a luminance channel and a chrominance channel with color subcarrier circuitry of which the outputs are combined to form a color signal, the improvement comprising means interposed in said luminance channel for suppressing energy at the frequency of the color subcarrier and for peaking the remaining high frequency energy of said luminance channel.

References Cited in the file of this patent

UNITED STATES PATENTS

| | | |
|---|---|---|
| 2,677,721 | Bedford | May 4, 1954 |
| 2,729,698 | Fredendall | Jan. 3, 1956 |
| 2,827,512 | Stahl et al. | Mar. 18, 1958 |